Patented Jan. 30, 1923.

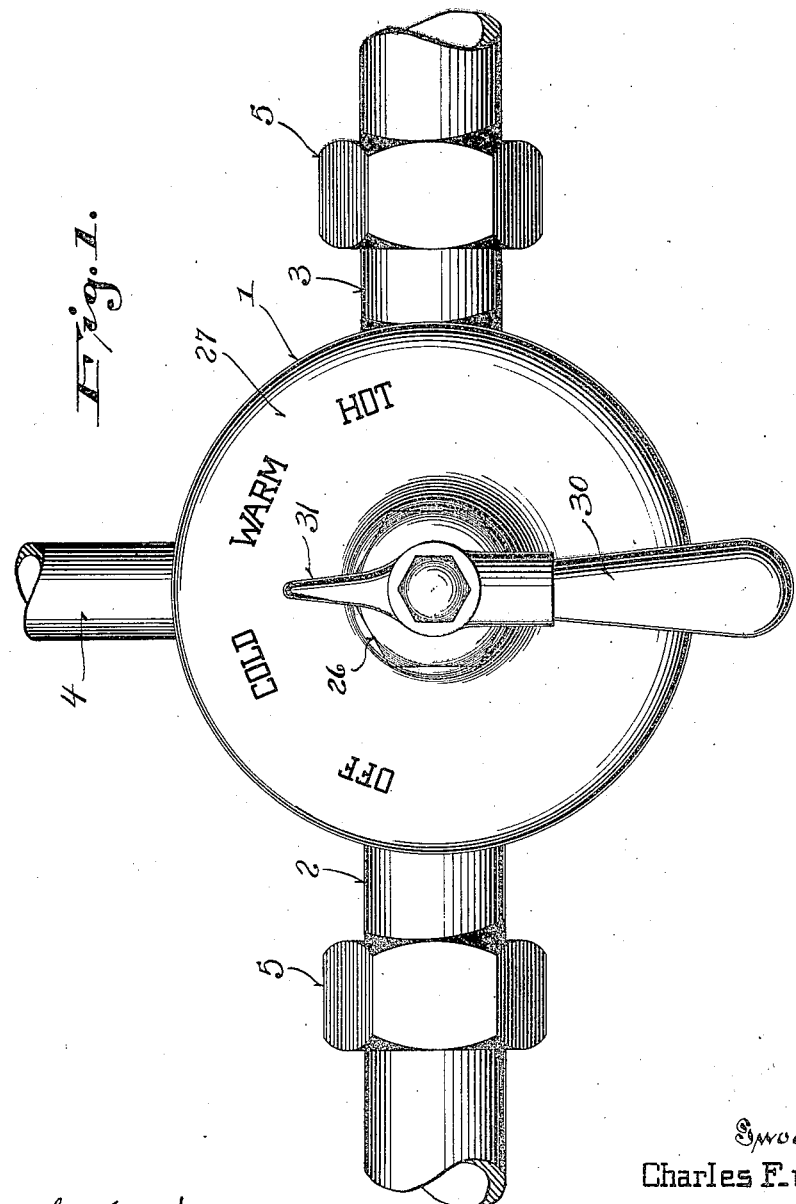

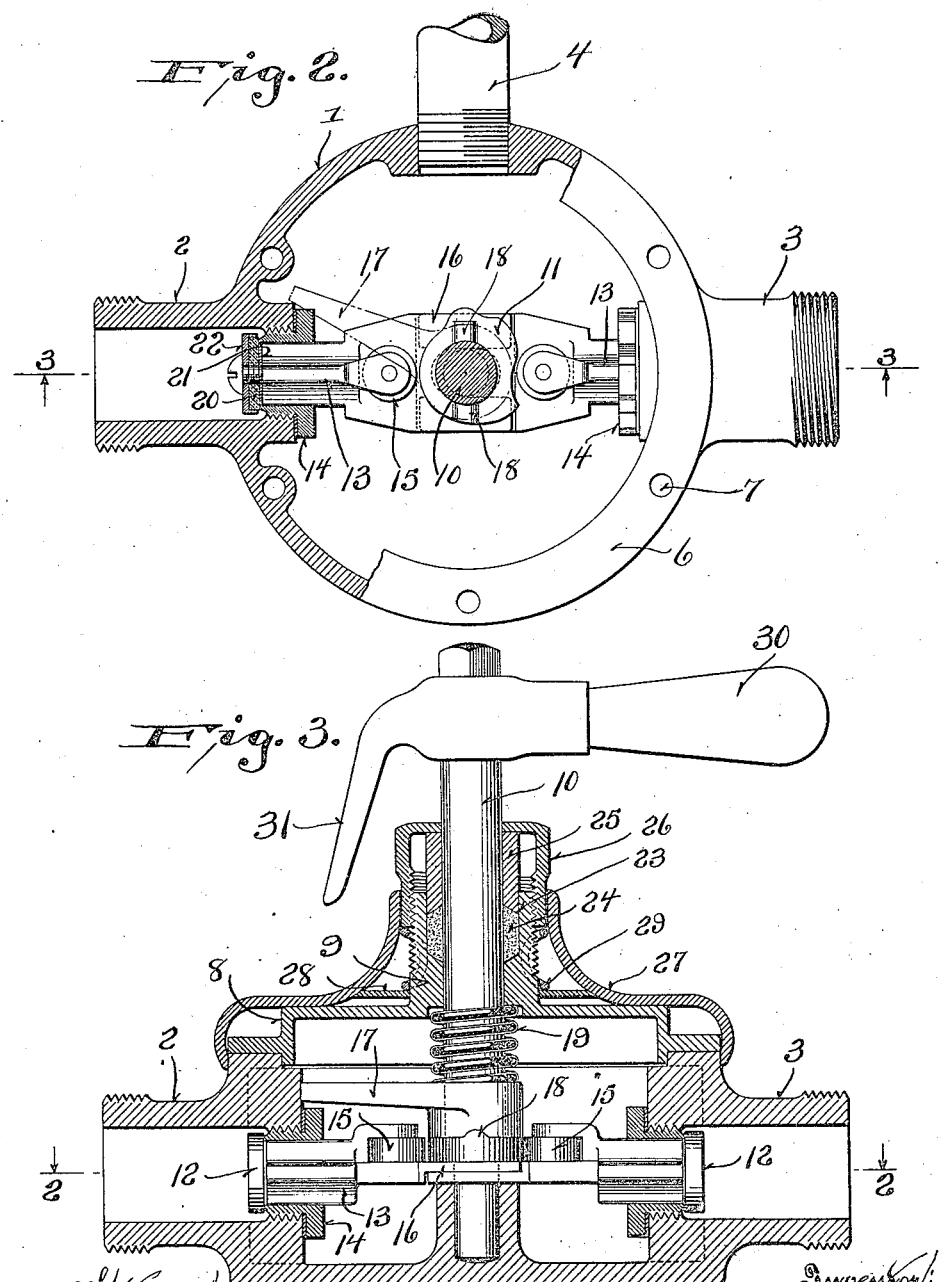

1,443,539

UNITED STATES PATENT OFFICE.

CHARLES F. JANSEN, OF MILWAUKEE, WISCONSIN.

MIXING VALVE.

Application filed September 3, 1921. Serial No. 498,202.

*To all whom it may concern:*

Be it known that I, CHARLES F. JANSEN, a citizen of the United States, and resident of Milwaukee, in the county of Milwaukee and State of Wisconsin, have invented certain new and useful Improvements in Mixing Valves; and I do hereby declare that the following is a full, clear, and exact description thereof.

My invention relates to a new and improved mixing valve of the type which is particularly adapted for use in connection with showers, but it may also be used on bath tubs, wash basins, and in fact, wherever hot and cold running water is used.

The general object of my invention is to improve the structure used in these devices so as to make the same more durable and more efficient in their operation.

A more specific object is to construct a device of this kind which may be conveniently disassembled for repairs without removing the chamber from the pipe line.

A further object of the invention is to provide a device which will present an attractive appearance when installed.

The invention also comprises improvements in various details which will be more fully described hereinafter and subsequently claimed.

In describing my invention reference will be had to the accompanying drawings, in which:—

Figure 1 is a plan view of the device as it appears when installed.

Figure 2 is a sectional plan view substantially on the line 2—2 of Figure 3.

Figure 3 is a sectional elevation on the line 3—3 of Figure 2.

Referring more specifically to the drawings, my device comprises a cylindrical chamber 1 which is provided with inlet nipples 2 and 3 which may be connected to the hot and cold water pipes by unions as shown at 5. The chamber is also provided with an outlet nipple 4. The cylindrical wall of the chamber is provided with a suitable flange 6 which provides a seat for the cover 8 which may be secured by suitable screws inserted in the holes 7. The cover 8 is provided centrally with an upwardly extending sleeve 9 in which is journalled a spindle 10. Within the chamber the spindle is provided with a cam 11 which upon rotation of the spindle actuates the valves 12 according to a pre-determined arrangement. When the spindle is turned to its off position the valves are closed by the pressure of the water.

Each valve is carrried on the end of a stem 13 which is reciprocably mounted in a bushing 14 which is threaded into the inner end of the inlet nipple. The inner end of the valve stem is provided with a roller 15 for engagement with the cam 11 and with two guide arms 16 which straddle the spindle 10 and guide the valve stem in its reciprocation. The spindle 10 is provided with a stop arm 17 to limit the movement of the spindle in its operation. This stop arm is journalled on the spindle and held in its position thereon by a clutch engagement 18 with the cam, the clutch being yieldably held in engagement by the spring 19. Each valve preferably comprises a suitable washer 20 made from rubber or the like, and a screw held on the end of the stem between the inner plate 21 and the outer cap 22. By this construction as will be seen the washer is almost completely enclosed, leaving only a small annular surface for engagement with the inner end of the bushing 14. By this means the valve is assured of a close engagement with its seat and the washer is prevented to a large extent from deteriorating.

For the purpose of forming a water tight connection between the spindle 10 and the sleeve 9 the latter is extended upwardly as shown at 23 to form a pocket around the spindle in which is placed a packing gland 24, the latter being adjustably retained by means of the sleeve 25 which extends inwardly from the cap 26 which is threaded on to the end 23 of the sleeve 9. In order to conceal the cover 8 and the sleeve 9 with its threads and sharp angles I provide a housing 27 of attractive appearance which may be suitably nickel plated and which is provided with an interior annular flange 28. Expansile springs 29 are inserted between the flange 28 and the inner end of the cap 26 to retain the housing in position in any adjustment to the cap.

Whenever it is desired to remove the spindle and valves for repair the cap 26, housing 27, and cover 8 may be removed whereupon the entire mechanism may be easily removed from the chamber without disconnecting the unions 5. This is an important feature since these connections are usually concealed and access to them is difficult unless an unsightly removable plate be left for this purpose. The spindle 10 is provided with a handle 30 and a pointer 31 which in connection with the indicia on the housing 27 indicates the position of the valves. In this connection it will be noted that a rotation of the spindle from its off position first gradually opens the cold water valve, until it is wide open while the hot water valve still remains closed. The pointer then is on "cold." As the spindle is further turned carrying the pointer from "cold" to "warm" the hot water valve is gradually opened to full open position while the cold water valve remains open. Upon further movement of the spindle and consequent movement of the pointer from "warm" to "hot," the hot water valve remains fully open while the cold water valve is gradually closed.

I claim as my invention:—

1. In a device of the character described, a mixing chamber having inlet openings, a pair of valves, a pair of valve stems each of said stems being rigid with one of said valves and extending thru one of said openings, a roller carried by each of said stems, a spindle, a pair of arms on each of said stems straddling said spindle, and a cam rigid with said spindle and operable on the rotation thereof by contact with said rollers for varying the position of said valves.

2. The combination of a valve chamber, a cover therefor, a sleeve on said cover, a packing in said sleeve, a second sleeve in said first mentioned sleeve, a cap in threaded relation with said first mentioned sleeve for urging said second sleeve against said packing, a spindle extending thru said sleeve and said packing, a housing enclosing said cover and having a nipple enveloping a portion of said cap, an inwardly extending flange on said housing and resilient means compressible between said cap and said flange for maintaining said housing in position.

In testimony that I claim the foregoing I have hereunto set my hand at Milwaukee, in the county of Milwaukee and State of Wisconsin.

CHARLES F. JANSEN.